(12) United States Patent
Chiba et al.

(10) Patent No.: US 10,738,652 B2
(45) Date of Patent: Aug. 11, 2020

(54) TURBOCHARGER

(71) Applicant: MITSUBISHI HEAVY INDUSTRIES ENGINE & TURBOCHARGER, LTD., Sagamihara-shi, Kanagawa (JP)

(72) Inventors: Takeru Chiba, Tokyo (JP); Toyotaka Yoshida, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 46 days.

(21) Appl. No.: 16/077,764

(22) PCT Filed: Mar. 4, 2016

(86) PCT No.: PCT/JP2016/056762
§ 371 (c)(1),
(2) Date: Aug. 14, 2018

(87) PCT Pub. No.: WO2017/149747
PCT Pub. Date: Sep. 8, 2017

(65) Prior Publication Data
US 2019/0048742 A1 Feb. 14, 2019

(51) Int. Cl.
*F01D 25/14* (2006.01)
*F02B 37/24* (2006.01)
(Continued)

(52) U.S. Cl.
CPC ......... *F01D 25/145* (2013.01); *F01D 17/165* (2013.01); *F01D 25/16* (2013.01);
(Continued)

(58) Field of Classification Search
CPC ........ F01D 25/145; F01D 17/00; F01D 17/14; F01D 17/146; F01D 17/16; F01D 17/165; F02B 37/24; F02C 6/12; F05D 2240/15
See application file for complete search history.

(56) References Cited

U.S. PATENT DOCUMENTS 4,735,556 A * 4/1988 Fujikake ............... F01D 25/145
165/904
4,875,837 A * 10/1989 Usami ................... F01D 25/145
417/407
(Continued)

FOREIGN PATENT DOCUMENTS

CN 101302941 A 11/2008
CN 103967542 A 8/2014
(Continued)

OTHER PUBLICATIONS

Written Opinion of the International Searching Authority and International Search Report (forms PCT/ISA/237 and PCT/ISA/210), dated Jun. 7, 2016, for International Application No. PCT/JP2016/056762, with English translations.

*Primary Examiner* — Kenneth J Hansen
*Assistant Examiner* — Jackson N Gillenwaters
(74) *Attorney, Agent, or Firm* — Birch, Stewart, Kolasch & Birch, LLP (57) ABSTRACT

This turbocharger (10A) is provided with: a nozzle flow passage (35) for radially inwardly guiding gas from a scroll flow passage (34) and supplying the gas to a turbine wheel (12); and a nozzle mount (51) provided on the bearing housing (16) side of the nozzle flow passage (35). The turbocharger (10A) is further provided with: a vane (53) for adjusting the amount of introduced gas in the nozzle flow passage (35); and a heat shielding part (80) for minimizing heat transfer across the nozzle mount (51) from the turbine housing (31) side to the bearing housing (16) side.

2 Claims, 5 Drawing Sheets

(51) Int. Cl.
*F01D 17/16* (2006.01)
*F02C 6/12* (2006.01)
*F02B 39/00* (2006.01)
*F01D 25/16* (2006.01)

(52) U.S. Cl.
CPC .............. *F02B 37/24* (2013.01); *F02B 39/00* (2013.01); *F02C 6/12* (2013.01); *F05D 2220/40* (2013.01); *F05D 2240/15* (2013.01); *F05D 2250/90* (2013.01); *F05D 2260/231* (2013.01); *Y02T 10/144* (2013.01)

(56) References Cited

U.S. PATENT DOCUMENTS

| 6,997,672 | B2 | 2/2006 | Wand et al. |
| 2008/0271449 | A1 | 11/2008 | Roberts et al. |
| 2011/0083433 | A1* | 4/2011 | Stroph .................... F01D 9/026 60/605.1 |
| 2014/0212277 | A1* | 7/2014 | Uesugi .................. F01D 17/145 415/151 |
| 2016/0258316 | A1* | 9/2016 | Ueda ....................... F02B 37/24 |
| 2018/0355889 | A1* | 12/2018 | Asakawa ................ F04D 17/10 |
| 2019/0071987 | A1* | 3/2019 | Shioya ................... F01D 9/041 |

FOREIGN PATENT DOCUMENTS

| JP | 62-40232 U | 3/1987 |
| JP | 2006-194135 A | 7/2006 |
| JP | 2009-174326 A | 8/2009 |
| JP | 2012-515295 A | 7/2012 |
| JP | 5340416 B2 | 11/2013 |
| WO | WO 2007/046798 A1 | 4/2007 |
| WO | WO 2011/152454 A1 | 12/2011 |
| WO | WO 2014/186129 A1 | 11/2014 |

* cited by examiner

TURBOCHARGER

TECHNICAL FIELD

The present invention relates to a turbocharger.

BACKGROUND ART

A turbocharger includes a turbocharger body, a compressor, and a turbine. The turbocharger body includes a rotating shaft and a bearing housing which rotatably supports the rotating shaft via a bearing. The rotating shaft includes a turbine wheel on a first end portion side and a compressor wheel on a second end portion side. The turbine wheel is accommodated in a turbine housing which is connected to the bearing housing. The compressor wheel is accommodated in a compressor housing which is connected to the bearing housing.

In the turbocharger, the turbine wheel is rotated by a flow of an exhaust gas supplied from an engine into the turbine housing. The compressor wheel provided in the compressor housing is rotated according to the rotation of the turbine wheel, and thus, air is compressed. The air compressed by the compressor is supplied to the engine.

During an operation of the turbocharger, a high-temperature exhaust gas flows to the turbine, and thus, a temperature of the turbine housing increases. If thermal energy of the turbine escapes to the bearing housing side, energy loss occurs in the turbine.

In order to prevent the bearing housing side from being damaged by a heat input from the turbine side, it is preferable to suppress the heat input from the turbine side to the bearing housing side.

PTL 1 discloses a configuration in which a heat insulating material is interposed between a turbine housing and a bearing housing in order to suppress a heat input from a turbine to the bearing housing.

CITATION LIST

Patent Literature

[PTL 1] Japanese Patent No. 5340416

SUMMARY OF INVENTION

Technical Problem

In a turbocharger in which a variable vane is included in a turbine, a nozzle vane, a disc-shaped mount plate rotatably supporting the nozzle vane, and a mechanism for changing an orientation of the nozzle vane are provided as members configuring the variable vane.

For this reason, it is necessary to suppress an input of heat, the heat being not only heat directly transmitted from a turbine housing to a bearing housing but also heat transmitted via the members configuring the variable vane, from the turbine side to the bearing housing side.

An object of the present invention is to provide a turbocharger including a variable vane, the turbocharger being capable of suppressing energy loss in a turbine and a heat input from the turbine to a bearing.

Solution to Problem

According to a first aspect of the present invention, there is provided a turbocharger including: a rotating shaft which extends along an axis; a turbine wheel which is provided on a first end portion side of the rotating shaft; a compressor wheel which is provided on a second end portion side of the rotating shaft; and a bearing housing which rotatably supports the rotating shaft. The turbocharger further includes a turbine housing which accommodates the turbine wheel; and a scroll flow path which is formed in the turbine housing, is continuous in a circumferential direction to be located radially outside the turbine wheel, and allows a gas rotating the turbine wheel to flow therethrough. The turbocharger further includes a nozzle flow path which allows the gas to be introduced radially inward from the scroll flow path and supplies the gas to the turbine wheel; and a nozzle mount which is provided on the bearing housing side with respect to the nozzle flow path. The turbocharger further includes a vane which is rotatably supported by the nozzle mount and adjusts an amount of the gas introduced into the nozzle flow path; and a heat shielding portion which suppresses an increase in a quantity of heat transmitted from the turbine housing side to the bearing housing side with the nozzle mount interposed therebetween.

In this way, the nozzle mount is interposed in the heat shielding portion to suppress an increase in the quantity of the heat transmitted from the turbine housing side to the bearing housing side, and thus, it is possible to inhibit heat on the turbine housing side from being transmitted to the bearing housing in a configuration where the nozzle flow path including the vane, of which an angle is variable, is included.

According to a second aspect of the present invention, in the turbocharger of the first aspect, the heat shielding portion may be a mount outer peripheral portion heat shielding material provided between an end portion radially outside the nozzle mount and at least one of the bearing housing or the turbine housing.

In this configuration, the mount outer peripheral portion heat shielding material can inhibit heat on the turbine housing side from being transmitted to the bearing housing via the nozzle mount.

According to a third aspect of the present invention, in the turbocharger of the first or second aspect, a rotating mechanism rotating the vane may be provided on the bearing housing side with respect to the nozzle mount, an accommodation chamber which accommodates the rotating mechanism may be formed in the bearing housing, and the heat shielding portion may be an accommodation chamber heat shielding material provided on an inner peripheral surface of the accommodation chamber.

In this configuration, heat on the turbine side is transmitted to the rotating mechanism via the nozzle mount since the rotating mechanism is provided on the bearing housing side with respect to the nozzle mount. However, it is possible to inhibit heat of the rotating mechanism from propagating to the inner peripheral surface of the accommodation chamber via air in the accommodation chamber since the rotating mechanism is accommodated in the accommodation chamber and the accommodation chamber heat shielding material is provided on the inner peripheral surface of the accommodation chamber. Therefore, it is possible to inhibit heat on the turbine housing side from being transmitted to the bearing housing.

According to a fourth aspect of the present invention, in the turbocharger of any one aspect of the first to third aspects, the turbine housing may have a scroll formed portion that forms the scroll flow path and a connecting portion that is formed to extend from the scroll formed portion to the bearing housing side, which is an opposite side, with the nozzle mount interposed therebetween, and is connected to the bearing housing. The heat shielding portion may be a housing outer peripheral heat shielding material covering only the connecting portion, out of the scroll formed portion and the connecting portion, from an outer peripheral side.

In this way, when the connecting portion is covered with the housing outer peripheral heat shielding material and the connecting portion is heated by heat on the turbine housing side, the heat is unlikely to escape from the connecting portion. Therefore, since the connecting portion is maintained at a high temperature, it is possible to suppress any more heat input from the turbine housing side. Therefore, it is possible to inhibit heat on the turbine housing side from being transmitted to the bearing housing.

According to a fifth aspect of the present invention, in the turbocharger of any one aspect of the first to fourth aspects, the heat shielding portion may be a mount surface heat shielding material provided in a portion of the nozzle mount, the portion facing the scroll flow path side.

According to this configuration, heat of an exhaust gas in the scroll flow path is unlikely to be transmitted to the nozzle mount. Therefore, it is possible to inhibit heat on the turbine housing side from being transmitted to the bearing housing via the nozzle mount.

Advantageous Effects of Invention

According to the turbocharger, it is possible for the turbocharger including the variable vanes to suppress the energy loss in the turbine and the heat input from the turbine to the bearing.

DESCRIPTION OF EMBODIMENTS

Next, a turbocharger according to embodiments of the present invention will be described with reference to the drawings.

First Embodiment

Figure 1:
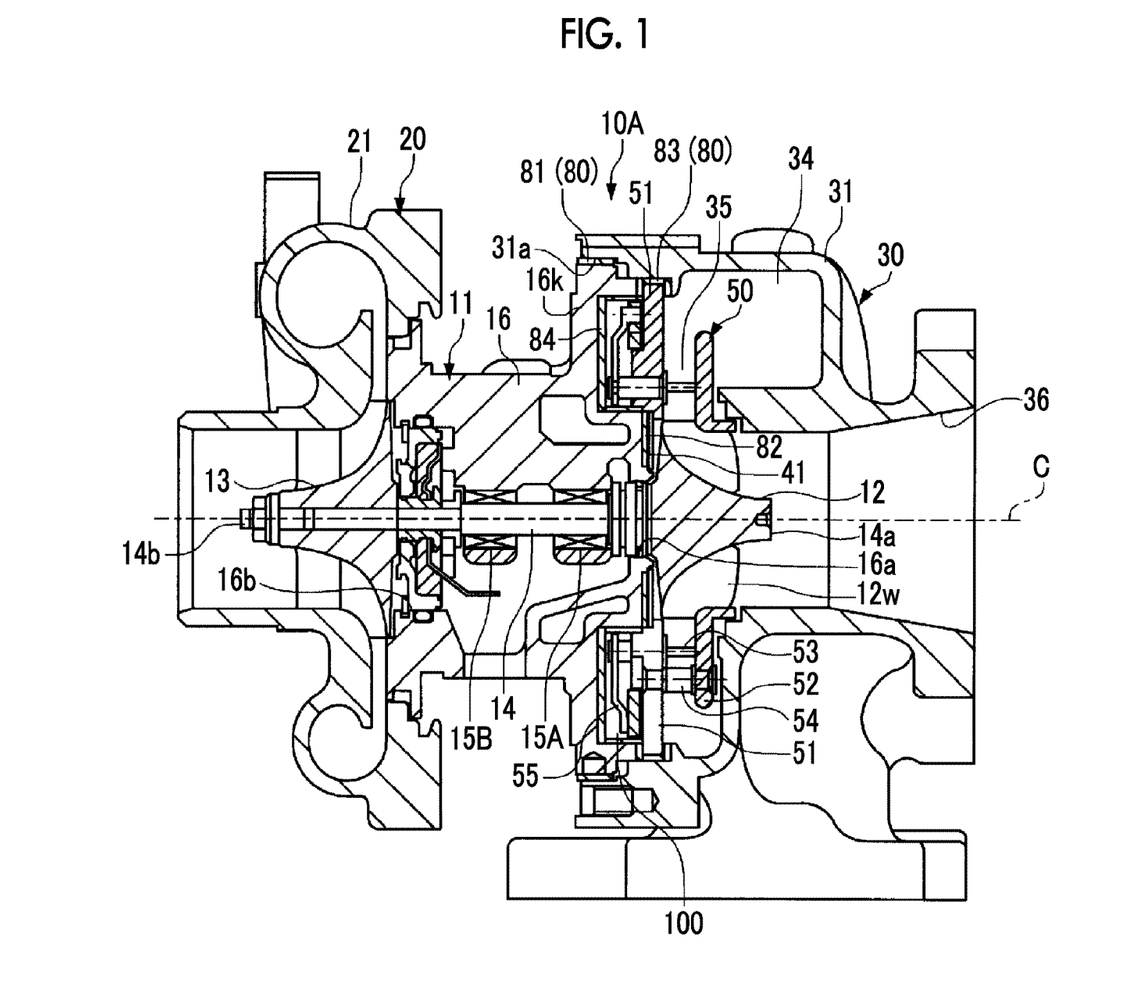
FIG. 1 is a cross-sectional view showing an overall configuration of a turbocharger according to an embodiment of the present invention.

FIG. 1 is a cross-sectional view showing an overall configuration of a turbocharger according to an embodiment of the present invention.

As shown in FIG. 1, a turbocharger 10A of the present embodiment includes a turbocharger body 11, a compressor 20, and a turbine 30. For example, the turbocharger 10A is mounted as an auxiliary machine of an engine on an automobile or the like in a state where a rotating shaft 14 extends in a horizontal direction. The turbocharger 10A is supported by a vehicle body or the like via a bracket (not shown), the compressor 20, the turbine 30, or the like.

The turbocharger body 11 includes the rotating shaft 14, a bearing 15A, and a bearing housing 16.

The rotating shaft 14 is rotatably supported by the bearing 15A accommodated in the bearing housing 16. A turbine wheel 12 is integrally formed on a first end portion 14a of the rotating shaft 14, and a compressor wheel 13 is attached to a second end portion 14b of the rotating shaft 14.

The bearing housing 16 is formed to accommodate the bearing 15A and to cover the rotating shaft 14 from the outside. The bearing housing 16 includes an opening 16a on a first end portion side of the bearing housing 16 and an opening 16b on a second end portion side thereof. The first end portion 14a and the second end portion 14b of the above-described rotating shaft 14 protrude toward the outside of the bearing housing 16 through the openings 16a and 16b, respectively. That is, each of the above-described turbine wheel 12 and the compressor wheel 13 is disposed outside the bearing housing 16.

The compressor 20 includes the compressor wheel 13 and a compressor housing 21. The compressor 20 is a so-called a centrifugal compressor and boosts air such as outside air. The boosted air is supplied to the engine.

The compressor wheel 13 is rotated together with the rotating shaft 14. The compressor wheel is rotated, and air flowing from an inlet of the compressor housing 21 is moved radially outward while being compressed and is discharged to the outside of the compressor housing 21 via a scroll or the like.

The turbine 30 recovers energy of an exhaust gas discharged from an engine (not shown). The turbine 30 mainly includes the turbine wheel 12 and a turbine housing 31.

The turbine wheel 12 converts energy of the exhaust gas into rotational energy. The turbine wheel 12 is accommodated in the turbine housing 31 and includes a plurality of turbine blades 12w in a circumferential direction. The turbine wheel 12 is rotated by the exhaust gas supplied to the inside of the turbine housing 31. The rotation of the turbine wheel 12 is transmitted to the compressor wheel 13 via the rotating shaft 14.

The turbine housing 31 has an opening 31a at a position facing the bearing housing 16. An accommodation space for accommodating the turbine wheel 12 is formed inside the turbine housing 31. The turbine housing 31 includes a gas introduction portion (not shown), a scroll flow path 34, and an exhaust section 36.

The gas introduction portion (not shown) feeds the exhaust gas discharged from the engine (not shown) to the scroll flow path 34.

The scroll flow path 34 is formed to be continuous to the gas introduction portion (not shown) and to be continuous in the circumferential direction so as to be located radially outside the turbine wheel 12. The scroll flow path 34 is formed as a flow path through which the exhaust gas rotating the turbine wheel 12 flows in the circumferential direction.

The scroll flow path 34 is formed by a scroll formed portion 31s that is formed on an outer peripheral portion of the turbine housing 31 so as to swell radially outward.

A nozzle flow path 35 is formed to a side of the turbine housing 31, which is close to the bearing housing 16. The nozzle flow path 35 is formed over the entire periphery in the circumferential direction such that the scroll flow path 34 communicates with the turbine wheel 12 radially outward.

The exhaust gas discharged from the turbine wheel 12 flows in the exhaust section 36. The exhaust section 36 is formed to be continuous from an outer peripheral portion of the turbine wheel 12 in a direction separated away from the turbocharger body 11 along a central axis C of the rotating shaft 14.

In the turbine 30, the exhaust gas which has flowed from gas introduction portion (not shown) flows to an outer peripheral side of the turbine wheel 12 in the circumferential direction along the scroll flow path 34. In this way, the exhaust gas flowing in the circumferential direction flows radially inward through the nozzle flow path 35 and strikes the turbine blades 12w of the turbine wheel 12, and thus, the turbine wheel 12 is rotated. The exhaust gas which has passed through the turbine wheel 12 is discharged from an inner peripheral side of the turbine wheel 12 to the exhaust section 36.

Figure 2:
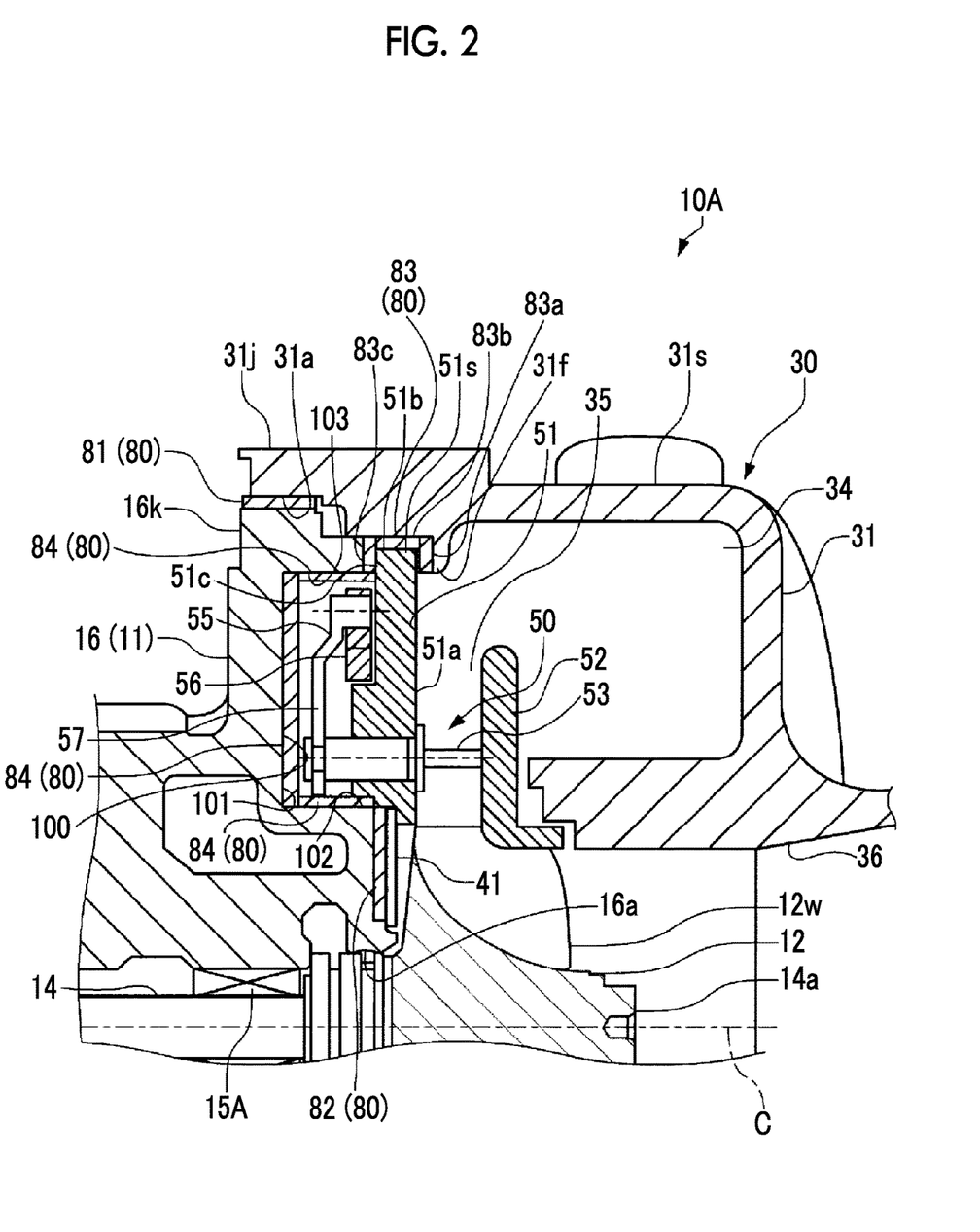
FIG. 2 is an enlarged cross-sectional view showing a configuration in the vicinity of a joint portion between a turbine housing and a bearing housing in a first embodiment of the present invention.

As shown in FIG. 2, a variable vane mechanism 50 adjusting the amount of the exhaust gas supplied from the scroll flow path 34 to the turbine wheel 12 through the nozzle flow path 35 is provided in nozzle flow path 35.

The variable vane mechanism 50 includes nozzle mounts 51, nozzle plates 52, vanes 53, and a drive unit (rotating mechanism) 55.

Each of the nozzle mounts 51 is provided on a side of the nozzle flow path 35, which is close to the bearing housing 16, and is formed in an annular plate shape positioned on a plane orthogonal to the central axis C.

Each of the nozzle plates 52 is provided on an opposite side to each of the nozzle mounts 51 with respect to the nozzle flow path 35 with a gap between the nozzle mount 51 and the nozzle plate. The nozzle flow path 35 is provided between the nozzle mounts 51 and the nozzle plates 52.

Each of the vanes 53 has a plate shape and is provided between the nozzle mount 51 and the nozzle plate 52. The plurality of vanes 53 are provided in the nozzle flow path 35, which is continuous in the circumferential direction, at intervals in the circumferential direction. Each of the vanes 53 is rotatably supported in a state of penetrating the nozzle mount 51 in the direction of the central axis C. The plurality of nozzle mounts 51 and the plurality of nozzle plates 52 are provided in the circumferential direction with a gap, and are fixed by a support pin 54.

The drive unit 55 adjusts the angle of each of the vanes 53 by rotating a supporting part of the vanes 53 protruding from the nozzle mounts 51 toward a bearing housing 16 side. The drive unit 55 is provided on the bearing housing 16 side with respect to the nozzle mounts 51. The drive unit 55 includes a drive ring 56 and link arms 57.

The drive ring 56 has an annular shape, and is provided radially outside a support pin 54. The drive ring 56 is provided to be rotatable in the circumferential direction thereof by an actuator (not shown), or the like.

Each of the link arms 57 is connected to each of the vanes 53. A first end portion of each of the link arms 57 is connected to each of the vanes 53, and a second end portion thereof is rotatably connected to the drive ring 56. When the drive ring 56 rotates, the link arms 57 rotate about the supporting part of the vanes 53, and accordingly, the angle of each of the vanes 53 changes.

In the bearing housing 16, an enlarged diameter portion 16K, which is enlarged radially outward, is formed close to the turbine 30.

The turbine housing 31 has a connecting portion 31j, which extends to the bearing housing 16 side from the scroll formed portion 31s through an outer peripheral side of the nozzle mount 51 and surrounds an outer peripheral side of the enlarged diameter portion 16K. The turbine housing 31 has the opening 31a inside the connecting portion 31j.

The turbine housing 31 and the bearing housing 16 are joined by inserting the enlarged diameter portion 16K into the opening 31a, which is inside the connecting portion 31j of the turbine housing 31.

Herein, a connecting portion heat shielding material 81 is provided between an inner peripheral surface of the connecting portion 31j of the turbine housing 31 and an outer peripheral surface of the enlarged diameter portion 16K of the bearing housing 16, as a heat shielding portion 80.

In the bearing housing 16, an accommodation chamber 100 for accommodating the drive unit 55 is formed radially outside the opening 16a to be depressed toward the compressor 20 (refer to FIG. 1).

In the accommodation chamber 100, an accommodation chamber heat shielding material 84 is provided, as the heat shielding portion 80, on each of a facing surface 101 facing the nozzle mounts 51 with a gap in the direction of the central axis C, an inner peripheral side peripheral surface 102 of the accommodation chamber 100, and an outer peripheral side peripheral surface 103 of the accommodation chamber 100.

The above-described nozzle mounts 51 are provided to close the accommodation chamber 100. Outer peripheral end portions (end portions) 51s of the nozzle mounts 51 each are interposed and supported between the turbine housing 31 and the bearing housing 16.

A back plate 41 is provided radially inside the nozzle mounts 51 to close a gap in an outer peripheral portion of the first end portion 14a of the rotating shaft 14. For example, the back plate 41 is formed of a material having heat resistance such as a stainless steel alloy and Inconel.

An inner peripheral heat shielding material 82 is provided between the back plate 41 and the bearing housing 16 as the heat shielding portion 80.

The outer peripheral end portions 51s, which are located radially outside the nozzle mounts 51, and a mount outer peripheral portion heat shielding material 83 are provided, as the heat shielding portion 80, between the turbine housing 31 and the bearing housing 16. More specifically, the mount outer peripheral portion heat shielding material 83 includes a first heat shielding material 83a, a second heat shielding material 83b, and a third heat shielding material 83c.

The first heat shielding material 83a is provided between side surfaces 51a of the nozzle mounts 51 and a facing portion 31f, which is formed in the turbine housing 31 and faces the side surfaces 51a.

The second heat shielding material 83b is provided between outer peripheral surfaces 51b of the nozzle mounts 51 and the turbine housing 31, which is located radially outside the outer peripheral surfaces.

The third heat shielding material 83c is provided between side surfaces 51c of the nozzle mounts 51, which face the bearing housing 16 side, and the bearing housing 16 facing the side surfaces 51c.

Each of the connecting portion heat shielding material 81, the inner peripheral heat shielding material 82, and the mount outer peripheral portion heat shielding material 83, each of which is provided as the heat shielding portion 80, is formed of a material having thermal conductivity lower than that of the turbine housing 31. The connecting portion heat shielding material 81, the inner peripheral heat shielding material 82, and the mount outer peripheral portion heat shielding material 83 can be formed of, for example, a heat insulating material or a heat shielding material having thermal conductivity of 0.1 W/m/K or less at the room temperature. For example, as the heat insulating material or the heat shielding material, a porous body, a sheet material, which is made of a ceramic material, a silica material, or the like can be used. The connecting portion heat shielding material 81, the inner peripheral heat shielding material 82, and the mount outer peripheral portion heat shielding material 83 may be formed by covering the heat insulating material or the heat shielding material with a metal net. Coating may be applied to the turbine housing 31, the bearing housing 16, and the nozzle mounts 51 with the heat shielding material having the thermal conductivity, thereby forming the connecting portion heat shielding material 81, the inner peripheral heat shielding material 82, and the mount outer peripheral portion heat shielding material 83.

The accommodation chamber heat shielding material 84 formed as the heat shielding portion 80 is formed of a material having thermal conductivity lower than that of the turbine housing 31 as in each of the connecting portion heat shielding material 81, the inner peripheral heat shielding material 82, and the mount outer peripheral portion heat shielding material 83. The accommodation chamber heat shielding material 84 can be formed of, for example, a heat insulating material or a heat shielding material having thermal conductivity of 0.1 W/m/K or less at the room temperature. For example, as the heat insulating material or the heat shielding material, a porous body, a sheet material, which is made of a ceramic material, a silica material, or the like can be used. The accommodation chamber heat shielding material 84 may be formed by covering the heat insulating material or the heat shielding material with a metal net. Coating may be applied to the accommodation chamber 100 with the heat shielding material having the thermal conductivity, thereby forming the accommodation chamber heat shielding material 84. In particular, the accommodation chamber heat shielding material 84 receives heat radiated from the nozzle mounts 51 closing the accommodation chamber 100 or the drive unit 55. For this reason, the accommodation chamber heat shielding material 84 may be formed, for example, in white.

Therefore, according to the turbocharger 10A of the above-described first embodiment, the nozzle mounts 51 are interposed between the heat shielding portions 80 to suppress an increase in the quantity of heat transmitted from the turbine housing 31 side to the bearing housing 16 side, and thus, it is possible to inhibit heat on the turbine housing 31 side from being transmitted to the bearing housing 16 in a configuration where the nozzle flow path 35 including the vanes 53, of which angles are variable, are included.

The mount outer peripheral portion heat shielding material 83 provided as the heat shielding portion 80 can inhibit heat on the turbine housing 31 side from being transmitted to the bearing housing 16 via the nozzle mounts 51.

The accommodation chamber heat shielding material 84 provided as the heat shielding portion 80 can inhibit heat transmitted from the turbine 30 to the drive unit 55 via the nozzle mounts 51 from propagating to an inner peripheral surface of the accommodation chamber 100 via air in the accommodation chamber 100. Therefore, it is possible to inhibit heat on the turbine housing 31 side from being transmitted to the bearing housing 16.

In this manner, in the turbocharger 10A including the vanes 53, of which angles are variable, it is possible to suppress energy loss in the turbine 30 and a heat input from the turbine 30 to the bearing. As a result, the operating efficiency of the turbine 30 can be increased, and an increase in the flow rate of oil or the like supplied for cooling or lubrication can be suppressed also in the bearing housing 16.

Modification Example of First Embodiment

A case where the third heat shielding material 83c of the mount outer peripheral portion heat shielding material 83 is provided between the side surfaces 51c of the nozzle mounts 51 and an outer peripheral end surface 16t of the bearing housing 16 is described in the first embodiment. For example, the third heat shielding material 83c can also be configured as follows.

Figure 3:
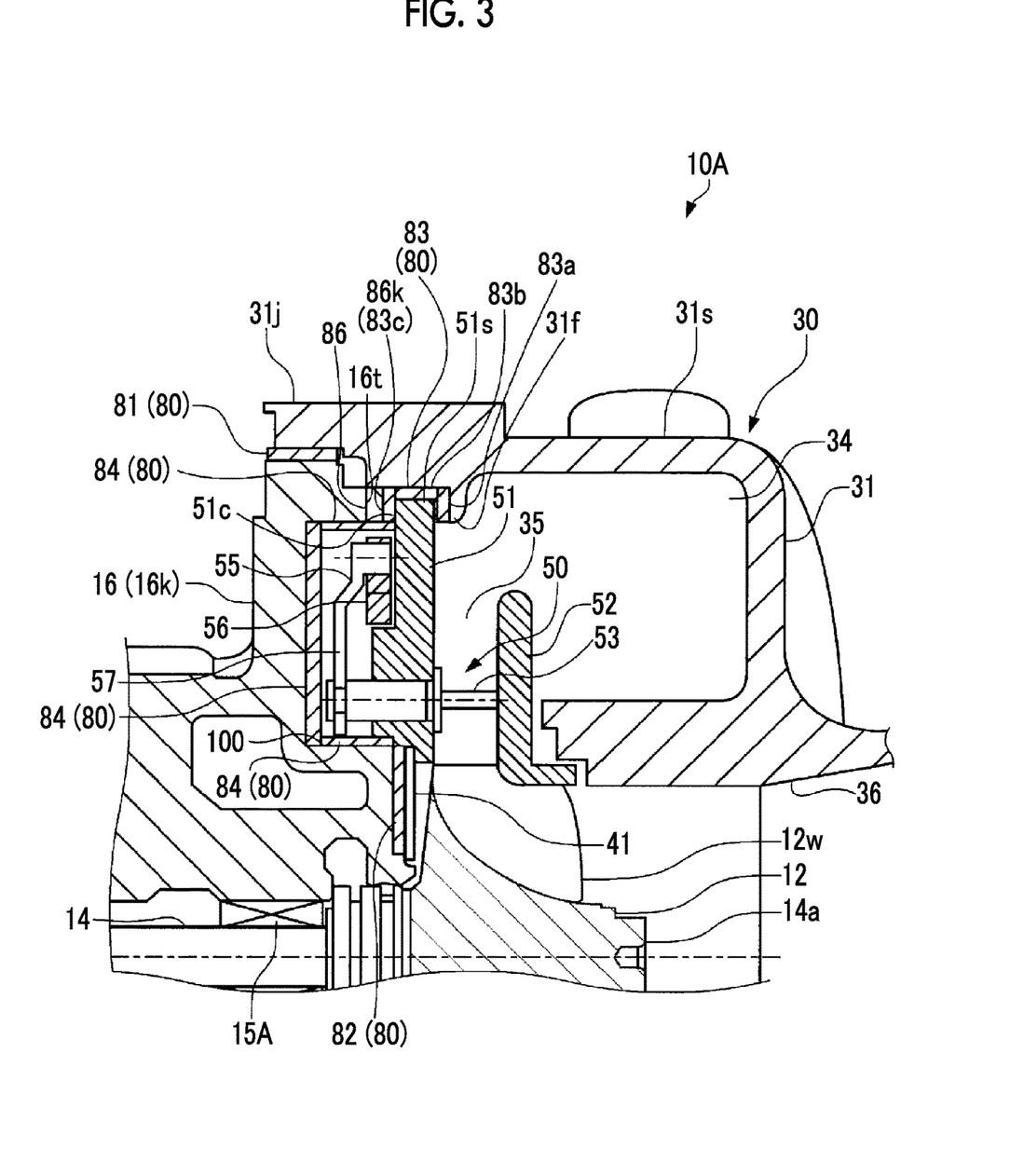
FIG. 3 is an enlarged cross-sectional view showing a configuration in the vicinity of a joint portion between a turbine housing and a bearing housing in a modification example of the first embodiment of the present invention.
Figure 4:
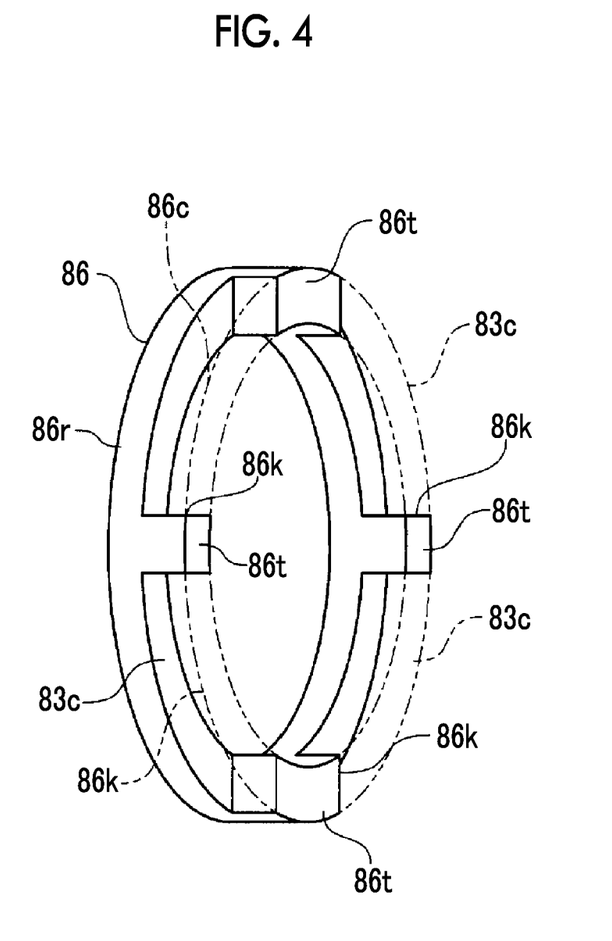
FIG. 4 is a view showing an example of a shape of a shim in the modification example of the first embodiment of the present invention.

FIG. 3 is an enlarged cross-sectional view showing a configuration in the vicinity of a joint portion between a turbine housing and a bearing housing in a modification example of the first embodiment of the present invention. FIG. 4 is a view showing an example of a shape of a shim in the modification example of the first embodiment of the present invention.

As shown in FIG. 3, a shim 86 may be provided between the side surfaces 51c of the nozzle mounts 51 and the outer peripheral end surface 16t of the bearing housing 16.

As shown in FIG. 4, the shim 86 integrally includes an annular portion 86r and protrusion portions 86t. The plurality of protrusion portions 86t are formed on one surface of the annular portion 86r at intervals in a circumferential direction. Therefore, each of cut-out portions 86k is formed between the protrusion portions 86t adjacent to each other in the circumferential direction on the one surface of the annular portion 86r of the shim 86.

The third heat shielding material 83c of the mount outer peripheral portion heat shielding material 83 is provided to fill the cut-out portions 86k.

In this way, even in the case where the shim 86 is provided, the mount outer peripheral portion heat shielding material 83 can be provided between the side surfaces 51c of the nozzle mounts 51 and the outer peripheral end surface 16t of the bearing housing 16. Therefore, it is possible to inhibit heat from being transmitted from the nozzle mounts 51 to the bearing housing 16, and it is possible to suppress energy loss in the turbine 30 and an heat input from the turbine 30 to the bearing housing 16.

The shim 86 is provided, and thus, it is possible to inhibit the mount outer peripheral portion heat shielding material 83 from being destroyed.

Second Embodiment

Next, a second embodiment of a turbocharger according to the present invention will be described. The second embodiment is different from the first embodiment only in terms of a position where a heat shielding material is provided, and the rest of the configuration of the entire turbocharger is the same as that of the first embodiment. For this reason, in the second embodiment, the same reference numerals are assigned to the same portions as those of the first embodiment, and overlapping descriptions thereof are omitted.

Figure 5:
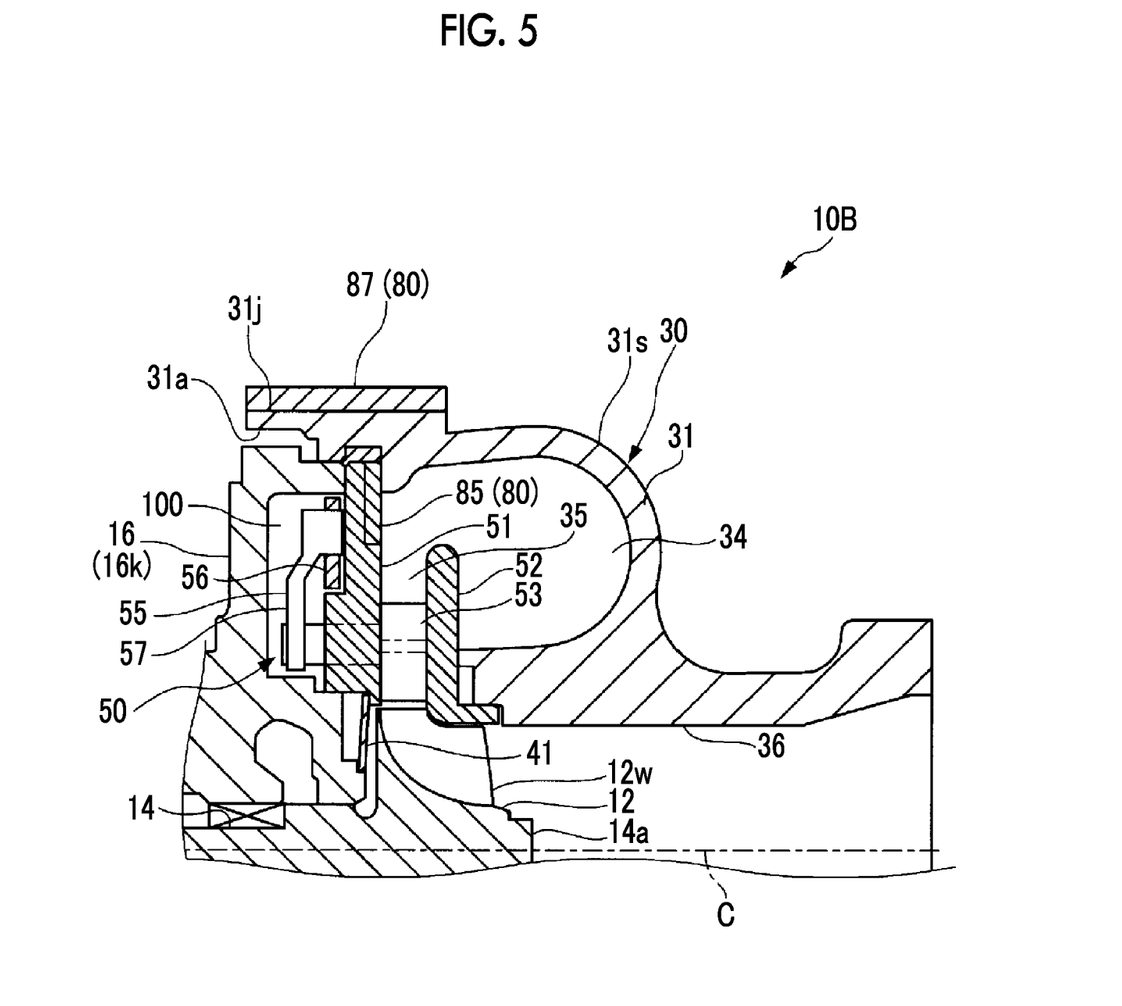
FIG. 5 is an enlarged cross-sectional view showing a configuration in the vicinity of a joint portion between a turbine housing and a bearing housing in a second embodiment of the present invention.

FIG. 5 is an enlarged cross-sectional view showing a configuration in the vicinity of a joint portion between a turbine housing and a bearing housing in the second embodiment of the present invention.

As shown in FIG. 5, in a turbocharger 10B, a mount surface heat shielding material 85, which is the heat shielding portion 80, is provided in a region of the nozzle mount 51, which faces the scroll flow path 34 radially outside the nozzle flow path 35.

In the turbocharger 10B, the turbine housing 31 is provided with a housing outer peripheral heat shielding material 87 covering only the connecting portion 31*j*, out of the scroll formed portion 31*s* and the connecting portion 31*j*, from the outer periphery of the housing, as the heat shielding portion 80.

Each of the mount surface heat shielding material 85 and the housing outer peripheral heat shielding material 87, each of which is provided as the heat shielding portion 80, is formed of a material having thermal conductivity lower than that of the turbine housing 31. The mount surface heat shielding material 85 and the housing outer peripheral heat shielding material 87 can be formed of, for example, a heat insulating material or a heat shielding material having thermal conductivity of 0.1 W/m/K or less at the room temperature. For example, as the heat insulating material or the heat shielding material, a porous body, a sheet material, which is made of a ceramic material, a silica material, or the like can be used. The mount surface heat shielding material 85 and the housing outer peripheral heat shielding material 87 may be formed by covering the heat insulating material or the heat shielding material with a metal net. Coating may be applied to the turbine housing 31 and the nozzle mounts with the heat shielding material having the thermal conductivity, thereby forming the mount surface heat shielding material 85 and the housing outer peripheral heat shielding material 87.

Therefore, according to the turbocharger 10B of the above-described second embodiment, the housing outer peripheral heat shielding material 87, which is provided as the heat shielding portion 80, covers only the connecting portion 31*j*. Thus, when the connecting portion 31*j* is heated by heat on the turbine housing 31 side, the heat is unlikely to escape from the connecting portion 31*j*. Therefore, since the connecting portion 31*j* is maintained at a high temperature, it is possible to suppress any more heat input from the turbine housing 31 side. Therefore, it is possible to inhibit heat on the turbine housing 31 side from being transmitted to the bearing housing 16.

Heat of the exhaust gas in the scroll flow path 34 is unlikely to be transmitted to the nozzle mounts 51 due to the mount surface heat shielding material 85 provided as the heat shielding portion 80. Therefore, it is possible to inhibit heat on the turbine housing 31 side from being transmitted to the bearing housing 16 via the nozzle mounts 51.

In this manner, in the turbocharger 10B including the vanes 53, of which angles are variable, it is possible to suppress energy loss in the turbine 30 and a heat input from the turbine 30 to the bearing. As a result, the operating efficiency of the turbine 30 can be increased, and an increase in the flow rate of oil or the like supplied for cooling or lubrication can be suppressed also in the bearing housing 16.

Other Modification Examples

The present invention is not limited to the above-described embodiments, and includes various modifications to the above-described embodiments within the scope which does not depart from the gist of the present invention. That is, the specific shapes, configurations, or the like described in the embodiments are merely examples, and can be appropriately changed.

In addition, the configuration of each portion such as the turbocharger body 11, the compressor 20, the turbine 30, or the like of the turbocharger 10A is not limited to those exemplified above, and may be changed to other configurations.

INDUSTRIAL APPLICABILITY

The present invention can be applied to the turbocharger. According to this invention, in the turbocharger including the variable vanes, it is possible to suppress the energy loss in the turbine and the heat input from the turbine to the bearing.

REFERENCE SIGNS LIST

10A: turbocharger
11: turbocharger body
12: turbine wheel
12*w*: turbine blade
13: compressor wheel
14: rotating shaft
14*a*: first end portion
14*b*: second end portion
15A, 15B: bearing
16: bearing housing
16K: enlarged diameter portion
16*a*: opening
16*b*: opening
16*s*: end surface
16*t*: outer peripheral end surface
20: compressor
30: turbine
31: turbine housing
31*a*: opening
31*j*: connecting portion
31*s*: scroll formed portion
34: scroll flow path
35: nozzle flow path
36: exhaust section
41: back plate
50: variable vane mechanism
51: nozzle mount
51*a*: side surface
51*b*: outer peripheral surface
51*c*: side surface
51*s*: outer peripheral end portion (end portion)
52: nozzle plate
53: vane
54: support pin
55: drive unit (rotating mechanism)
56: drive ring
57: link arm
80: heat shielding portion
81: connecting portion heat shielding material
82: inner peripheral heat shielding material
83: mount outer peripheral portion heat shielding material
83*a*: first heat shielding material
83*b*: second heat shielding material
83*c*: third heat shielding material
84: accommodation chamber heat shielding material
85: mount surface heat shielding material
86: shim
86*k*: cut-out portion
86*r*: annular portion
86*t*: protrusion portion
87: housing outer peripheral heat shielding material
100: accommodation chamber
101: facing surface 102: inner peripheral side peripheral surface
103: outer peripheral side peripheral surface
C: central axis (axis)

The invention claimed is:

1. A turbocharger comprising: a rotating shaft which extends along an axis; a turbine wheel which is provided on a first end portion side of the rotating shaft; a compressor wheel which is provided on a second end portion side of the rotating shaft; a bearing housing which rotatably supports the rotating shaft; a turbine housing which accommodates the turbine wheel; a scroll flow path which is formed in the turbine housing, is continuous in a circumferential direction to be located radially outside the turbine wheel, and allows a gas rotating the turbine wheel to flow therethrough; a nozzle flow path which allows the gas to be introduced radially inward from the scroll flow path and supplies the gas to the turbine wheel; a nozzle mount which is provided on a bearing housing side of the nozzle flow path; a vane which is rotatably supported by the nozzle mount and adjusts an amount of the gas introduced into the nozzle flow path; and a heat shielding portion which suppresses an increase in a quantity of heat transmitted from a turbine housing side of the nozzle flow path to the bearing housing side with the nozzle mount interposed therebetween, wherein the turbine housing includes a scroll formed portion that forms the scroll flow path, and a connecting portion that is formed to extend from the scroll formed portion to the bearing housing side, which is an opposite side, with the nozzle mount interposed therebetween, and is connected to the bearing housing, and wherein the heat shielding portion includes a mount outer peripheral portion heat shielding material provided between an end portion radially outside the nozzle mount and at least one of the bearing housing or the turbine housing, and a housing outer peripheral heat shielding material covering only the connecting portion, out of the scroll formed portion and the connecting portion, from an outer peripheral side of the turbine housing.

2. The turbocharger according to claim 1,
wherein a rotating mechanism rotating the vane is provided on the bearing housing side with respect to the nozzle mount,
an accommodation chamber which accommodates the rotating mechanism is formed in the bearing housing, and
the heat shielding portion includes an accommodation chamber heat shielding material provided on an inner peripheral surface of the accommodation chamber.

* * * * *